United States Patent [19]
Alburn et al.

[11] 3,846,406
[45] Nov. 5, 1974

[54] 6-[2-(1,4-CYCLOHEXADIEN-1-YL) ACETAMIDO]PENICILLANIC ACID

[75] Inventors: Harvey E. Alburn, West Chester; William Dvonch, Radnor, both of Pa.

[73] Assignee: American Home Products Corporation, New York, N.Y.

[22] Filed: Sept. 24, 1970

[21] Appl. No.: 75,261

Related U.S. Application Data

[63] Continuation of Ser. No. 843,739, July 22, 1969, abandoned.

[52] U.S. Cl.............................. 260/239.1, 424/271
[51] Int. Cl............................................ C07d 99/16

[58] Field of Search.................................. 260/239.1

[56] References Cited
UNITED STATES PATENTS
2,941,995  6/1960  Doyle et al. ..................... 260/239.1

*Primary Examiner*—Nicholas Rizzo
*Attorney, Agent, or Firm*—Andrew Kafko

[57] ABSTRACT

This invention concerns 6-(1,4-cyclohexadienylacylamido) penicillanic acids and the salts thereof which have potent antibiotic activity particularly against penicillin resistant staphylococci.

1 Claim, No Drawings

6-[2-(1,4-CYCLOHEXADIEN-1-YL) ACETAMIDO] PENICILLANIC ACID

This application is a continuation of U.S. Ser. No. 843,739, which was filed July 22, 1969 and has since been abandoned.

The present invention relates to new and novel synthetic penicillins. In particular, this invention relates to 6-(1,4-cyclohexadienylacylamido)penicillanic acids and the salts thereof which in standard and accepted biological procedures have demonstrated activity against penicillin resistant staphylococci.

The new and novel penicillins of the present invention are exemplified by the following structural formula:

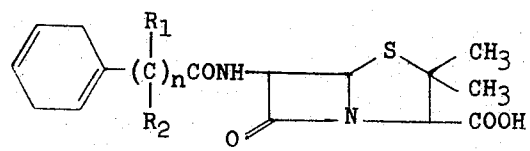

wherein $R_1$ and $R_2$ are both selected from the group consisting of hydrogen and lower alkyl; $n$ is an integer from 1 to about 6; and the non-toxic biologically active salts thereof. As employed herein the term "lower alkyl" is meant to include both branched and straight chain moieties having from one to about six carbon atoms. Typical examples are: 6-[2-(1,4-cyclohexadien-1-yl)acetamido]penicillanic acid; 6-[3-(1,4-cyclohexadien-1-yl)propionamido]penicillanic acid; 6-[3-(1,4-cyclohexadien-1-yl)butyramido]penicillanic acid; and 6-[2-(1,4-cyclohexadien-1-yl)caproamido]penicillanic acid.

The new and novel penicillins of the present invention may be prepared by the process which is illustrated by the following reaction sequence:

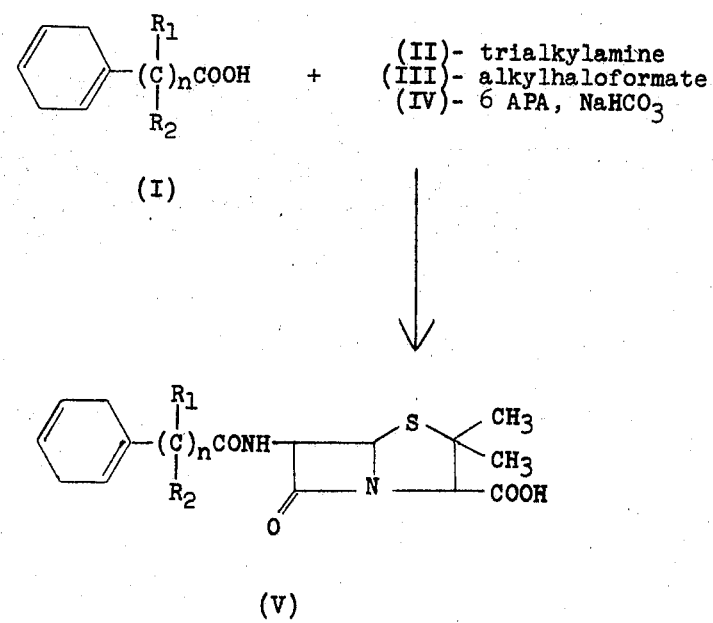

wherein $R_1$, $R_2$ and $n$ are defined as above. The above reaction is effected by contacting a (1,4-cyclohexadien-1-yl)alkanoic acid (I) in a reaction-inert organic solvent, e.g., acetone, chloroform or dioxane with about an equimolar amount of trialkylamine (II) e.g., trimethylamine at about room temperature for a period of about ½ to about 2 hours. Thereafter, the resulting mixture is cooled to about 0°C., admixed with an alkylhaloformate, (III) e.g., ethylchloroformate, cooled to about −50°C. in a dry-ice-acetone bath and admixed with a chilled aqueous alkali metal bicarbonate solution of 6-aminopenicillanic acid (6-APA, IV) at about 0°C. for about a half hour. The reaction mixture is then allowed to equilibrate to about room temperature, extracted with a water immiscible organic solvent, e.g., ether, acidified with a mineral acid, e.g., hydrochloric acid, extracted with methyl isobutyl ketone, and then evaporated to dryness to afford an appropriate 6-(1,4-cyclohexadienylacylamido)penicillanic acid (V).

The above prepared penicillin (V) is normally recovered from the reaction mixture in which it is formed as a salt, suitably the potassium or sodium salt. The salts of these novel penicillanic acids (V) usually crystallize well, e.g., the alkali metal salts may be crystallized by concentrating their aqueous solutions.

If desired, the free acid or a salt, for example, the potassium salt, may be converted by metathetic reaction to another salt. Thus, by mixing an aqueous solution of the potassium salt of one of the new penicillanic acids (V) of this invention with an aqueous solution of the acetate of N,N'-dibenzylethylenediamine, there is obtained a crystalline precipitate of the dibenzylethylenediamine salt thereof. Other salts, if desired, may be prepared similarly. Thus, by mixing a concentrated aqueous solution of the potassium or sodium salt of one of these new penicillanic acids (V) with an aqueous solution of dibenzylamine acetate, there is obtained a precipitate of the corresponding dibenzylamine penicillin.

The (1,4-cyclohexadien-1-yl)alkanoic acid (I) starting materials employed in the above reaction are prepared by the procedure described in copending U.S. Pat. application, Ser. No. 843,802, by Harvey E. Alburn and William Dvonch, entitled "(1,4-Cyclohexadien-1-yl)Alkanoic Acids," identified by Attorney Docket No. AHP-5095, filed in the United States Patent Office on the same day as the subject application. Therein the (1,4-cyclohexadien-1-yl)alkanoic acids are prepared by subjecting their corresponding phenylalkanoic acids to a Birch reduction. The 6-aminopenicillanic acid reactant may be prepared by numerous methods now available in the prior art, including the methods referred to in U.S. Pat. Nos. 2,985,648 and 3,032,473.

The new and novel 6-(1,4-cyclohexadienylacylamido) penicillanic acids (V) of the present invention also possess valuable antibiotic activity. In particular, in standard and accepted biological tests these compounds have exhibited activity against staphylococci, e.g., S. aureus CHP which are resistant to ordinary penicillins, e.g., benzyl penicillin. In this regard, these compounds are, therefore, of value as antibacterial agents in the treatment of infectious diseases caused by penicillin resistant staphylococci, upon either parenteral or oral administration.

As previously indicated, when the compounds (V) of this invention are employed in mammals, e.g., mice, rats, dogs, monkeys and the like, they may by administered orally or parenterally. Naturally, the dosage of these compounds will vary somewhat with the form of administration and the particular compound chosen. Furthermore, it will vary with the particular subject under treatment. In general, the compounds of this invention are most desirably administered at a dosage level that is in the range of from about 10 to about 400 mg. per kilo per day, although as aforementioned variations will occur. However, this dosage range will generally afford effective results without causing any harmful or deleterious side effects.

The following examples are given by way of illustration:

EXAMPLE I

Ethylchloroformate (0.98 ml., 0.010 mole) is added to an ice-cold solution of 2-(1,4-cyclohexadien-1-yl)acetic acid (1.38 g., 0.010 mole) and triethylamine (1.70 ml., 0.012 mole) in acetone (80 ml.). The solution is stirred at 0°C. for 10 minutes and cooled to −50°C. with Dry-Ice-acetone. The suspension is rapidly stirred with an ice-cold solution of 6-aminopenicillanic acid (2.59 g., 0.012 mole) in 3 percent sodium bicarbonate solution (84 ml.) is added. The reaction is stirred at 0°C. for ½ hour, at 25°C. for another half hour and extracted with ether (3 × 80 ml.). The pH of the aqueous phase is dropped from 8.4 to 2.5 with hydrochloric acid, and the solution is extracted with methyl isobutyl ketone (3 × 60 ml.). The organic layer is then separated and evaporated to dryness to yield 6-[2-(1,4-cyclohexadien-1-yl)acetamido]penicillanic acid.

Alternatively, an equal volume of water is added to the organic phase, and the pH of the aqueous phase is adjusted to 6.0 with solid sodium bicarbonate. The aqueous phase is separated, concentrated to remove the methyl isobutyl ketone, and freeze-dried to yield the sodium salt of 6-[2-(1,4-cyclohexadien-1-yl)acetamido]penicillanic acid.

When the above procedure is repeated substituting 3-(1,4-cyclohexadien-1-yl) propionic acid for 2-(1,4-cyclohexadien-1-yl)acetic acid, the product obtained is sodium salt of 6-[3-(1,4-cyclohexadien-1-yl)propionamido]penicillanic acid.

EXAMPLE II

Ethylchloroformate (0.020 mole) is added to an ice-cold solution of 2-(1,4-cyclohexadien-1-yl)butyric acid (0.020 mole) and triethylamine (0.024 mole) in acetone (168 ml.). The solution is stirred at 0°C. for fifteen minutes and cooled to −50°C. with Dry-Ice-acetone. The suspension is rapidly stirred while an ice-cold solution of 6-aminopenicillanic acid (0.024 mole) in 3 percent potassium bicarbonate solution (168 ml.) is added. The reaction is stirred at 0°C. for a half hour, at 25°C. for another half hour, and extracted with ether (3 × 160 ml.). The pH of the aqueous phase is lowered from 8.4 to 2.5 with hydrochloric acid, and the solution extracted with methyl isobutyl ketone (3 × 60 ml.). The organic layer is then separated and evaporated to dryness to afford 6-[3-(1,4-cyclohexadien-1-yl)butyramido]penicillanic acid.

In a similar manner, 6-aminopenicillanic acid is reacted with 2-(1,4-cyclohexadien-1-yl)caproic acid to yield 6-[2-(1,4-cyclohexadien-1-yl)caproamido]penicillanic acid.

EXAMPLE III

Ethylchloroformate (0.010 mole) is added to an ice-cold solution of 2-(1,4-cyclohexadien-1-yl)-2-methylpropionic acid (1.38 g., 0.010 mole) and triethylamine (0.012 mole) in acetone (80 ml.). The solution is stirred at 0°C. for 10 minutes and cooled to −50°C. with Dry-Ice-acetone. The suspension is rapidly stirred while an ice-cold solution of 6-aminopenicillanic acid (0.012 mole) in 3 percent sodium bicarbonate solution (84 ml.) is added. The reaction is stirred at 0°C. for a half hour and at 25°C. for another half hour, and extracted with ether (3 × 80 ml.). The pH of the aqueous phase is lowered from 8.4 to 2.5 with hydrochloric acid, and the solution extracted with methyl isobutyl ketone (3 × 60 ml.). The organic layer is then separated and evaporated to dryness to yield 6-[2-(1,4-cyclohexadien-1-yl)-2-methylpropionamido]penicillanic acid.

Alternatively, an equal volume of water is added to the organic base, and the pH of the aqueous phase is adjusted to 6.0 with sodium bicarbonate. The aqueous phase is separated, concentrated to remove the methyl isobutyl ketone and freezedried to yield the corresponding sodium salt.

EXAMPLE IV

Repeating the procedure of Examples I – III to react the following (1,4-cyclohexadien-1-yl)alkanoic acid reactants with 6-aminopenicillanic acid, the following products are obtained:

| REACTANTS | PRODUCTS |
| --- | --- |
| 4-(1,4-cyclohexadien-1-yl)-butyric acid | 6-[4-(1,4-cyclohexadien-1-yl)butyramido]penicillanic acid |
| 5-(1,4-cyclohexadien-1-yl)-acetic acid | 6-[5-(1,4-cyclohexadien-1-yl)acetamido]penicillanic acid |
| 5-(1,4-cyclohexadien-1-yl)-valeric acid | 6-[5-(1,4-cyclohexadien-1-yl)valeramido]penicillanic acid |
| 6-(1,4-cyclohexadien-1-yl)-caproic acid | 6-[6-(1,4-cyclohexadien-1-yl)caproamido]penicillanic acid |
| 2-(1,4-cyclohexadien-1-yl)-valeric acid | 6-[2-(1,4-cyclohexadien-1-yl)valeramido]penicillanic acid |
| 2-ethyl-2-(1,4-cyclohexadien-1-yl)butyric acid | 6-[2-ethyl-2-(1,4-cyclohexadien-1-yl)butyramido]penicillanic acid |
| 2-butyl-3-(1,4-cyclohexadien-1-yl)caproic acid | 6-[2-butyl-3-(1,4-cyclohexadien-1-yl)caproamido]penicillanic acid |
| 5-(1,4-cyclohexadien-1-yl)-3,4-dimethylvaleric acid | 6-[5-(1,4-cyclohexadien-1-yl)-3,4-dimethylvaleramido]penicillanic acid |

What is claimed is:

1. 6-[2-(1,4-cyclohexadien-1-yl)acetamido]penicillanic acid.

\* \* \* \* \*